United States Patent [19]
Flint

[11] 3,747,753

[45] July 24, 1973

[54] FLUID BEARING APPARATUS AND METHOD FOR HANDLING AND GAGING ARTICLES

[75] Inventor: Alan G. Flint, San Jose, Calif.

[73] Assignee: Industrial Systems Corporation, Santa Clara, Calif.

[22] Filed: Jan. 24, 1972

[21] Appl. No.: 220,336

[52] U.S. Cl. ............... 209/73, 209/74 R, 209/80, 209/82
[51] Int. Cl. ................................ B07b 13/04
[58] Field of Search ............... 209/73, 74, 81 R, 209/80, 82, 81 A

[56] References Cited
UNITED STATES PATENTS

| | | | |
|---|---|---|---|
| 3,547,262 | 12/1970 | Adsmond | 209/81 R |
| 3,028,959 | 4/1962 | Clark et al. | 209/81 R |
| 2,990,954 | 7/1961 | Thompson | 209/82 |
| 3,662,881 | 5/1972 | Fineran | 209/81 R |
| 3,385,433 | 5/1968 | Grimaldi et al. | 209/80 X |
| 3,209,908 | 10/1965 | Hopkins | 209/81 R |

Primary Examiner—Allen N. Knowles
Attorney—Paul D. Flehr, Milton W. Schlemmer et al.

[57] ABSTRACT

An improved apparatus and method for sorting articles, such as silicon and like wafers used in making electronic devices, according to size. Articles are transferred on a fluid bearing track structure in sequence to a gaging station following which the measured articles are selectively directed to a predetermined receiver station according to their size.

33 Claims, 7 Drawing Figures

Patented July 24, 1973 3,747,753

FLUID BEARING APPARATUS AND METHOD FOR HANDLING AND GAGING ARTICLES

Means for directing articles to a predetermined receiver station in accordance with their measured size are provided at various junctures of the track sections defining the fluid bearing track structure.

The articles being gaged are measured for thickness and/or parallelism. Individual articles are fed in sequence from a sender station past the gaging station to one of two or more receiver stations, such as a selected receiver station to which articles within a predetermined size range are directed, and high and low receiver stations to which oversize or underside articles are directed.

While pneumatic means for selectively diverting gaged articles into predetermined receiver stations are effectively used, mechanically actuated diverting means also are utilizable.

CROSS-REFERENCE TO RELATED APPLICATIONS

The fluid bearing track structure utilized with the present invention, with the exception of that portion thereof which is specifically designed for utility at the gaging station as described hereinafter, may take the form and construction disclosed in several applications previously filed by applicant's assignee, Industrial Modular Systems Corporation. Similarly, the supply and receiver magazines, and magazine indexing means, provided at the sender (supply) station and at the respective receiver stations also may take the form and construction disclosed in previously filed applications of applicant's assignee, Industrial Modular Systems Corporation.

To that end, such track structure and magazine structure and indexing means at the sender and receiver stations preferably take the form illustrated and described in Lasch, Jr. et al. application Ser. No. 779,033 "Apparatus And Method For Handling And Treating Of Articles" filed Nov. 26, 1968, now U.S. Pat. No. 3,645,581 dated Feb. 20, 1972, and in Lasch, Jr. application Ser. No. 174,808 "Fluid Bearing Track Structure And Components Thereof, And Method Of Producing Same" filed Aug. 25, 1971. Such applications illustrate desirable means for transporting articles, such as silicon wafers utilized in the manufacture of semiconductor devices in the electronics industry, from one station to another in conjunction with desirable means for automatically indexing magazines from and into which supplies of articles may be automatically removed and fed in sequence in conjunction with their movement between predetermined stations on the fluid bearing track structure.

BACKGROUND OF THE INVENTION

1. Field of the Invention

This invention relates generally to the field of improved apparatus and method for automatically handling and gaging articles, such as silicon and like wafers utilized in the production of semiconductor devices in the electronics industry. More particularly, this invention relates to the field of systems for automatically transferring articles between stations, accompanied by a measuring or gaging of the articles during their transfer, and for automatically sorting such measured articles following gaging in accordance with predetermined dimensional limitations thereof.

More particularly, this invention relates to the field of improved apparatus and method for measuring the thickness of flat articles and the presence or absence of parallelism of their opposite planar surfaces while the same are being handled automatically on a fluid bearing track structure. Still more particularly, this invention relates to the field of systems for automatically gaging semiconductor wafers and for automatically sorting such wafers into groups determined by their size by utilizing pneumatic means to effect thickness measurement, and article sorting, and transportation without manual handling.

2. Description of the Prior Art

While the specific pneumatic thickness gaging means disclosed herein has been known heretofore and is available on the market as will be described, the utilization of such a pneumatic gage for the measurement of articles, such as silicon and like wafers utilized in the production of semiconductor devices in the electronics industry, while the same are being automatically handled, transported and sorted, on a fluid bearing track structure so that no manual handling thereof is required, is believed novel and, so far as is known, has not been utilized heretofore. While, as noted, certain aspects of the track structure and indexing means disclosed herein have been developed by applicant's assignee previously hereto, as described in said applications above identified, the combination of features presented herein in which flat articles are automatically handled, gaged, and segregated according to size and/or parallelism, utilizing improved article transporting and diversion techniques for such handling and segregation, has been unknown heretofore.

In the electronics industry, silicon and like wafers utilized for the production of semiconductor devices desirably are measured or gaged with respect to their thickness and/or parallelism, and the present invention is directed to an apparatus and method for automatically gaging such articles in rapid sequence without manual handling, and segregating or sorting the articles in accordance with predetermined size ranges and degree of parallelism. While hereinafter the novel features of this invention are directed to the measurement or gaging of flat articles according to their thickness, it should be understood that the novel features hereof can be utilized to determine dimensions other than thickness as well.

With the present invention automatic transfer of individual articles in sequence from a sender or supply station, to and past a gaging station, and into one of two or more preselected receiver stations in accordance with signals transmitted from the gaging station, is effected automatically and without manual handling in a fashion which, so far as is known, has not been utilized in the art heretofore.

SUMMARY OF THE INVENTION

The present invention relates to an improved apparatus and method for handling and gaging articles, particularly generally flat articles such as silicon and like wafers commonly utilized in the electronics industry for the manufacture of semiconductor devices. More particularly, this invention relates to an improved fluid bearing apparatus and method which utilizes fluid bearing track structure for automatically transferring articles to be gaged or measured from a sender or supply station to and past a gaging station for sorting and segregating the articles into predetermined receiver stations in accordance with the measurements of the respective articles determined automatically at the gaging station.

Still more particularly, this invention relates to an improved fluid bearing apparatus and method for measuring the thickness and/or parallelism of flat articles, such as silicon and like wafers, and for segregating such articles into groups in accordance with the gaging measurement determined on individual articles in sequence at a gaging station. This invention further relates to a fluid bearing apparatus which utilizes a pneumatic means for determining the thickness and/or parallelism of flat articles which are subsequently segregated after gaging into groups of similar size or other characteristics.

From the foregoing it should be understood that objects of this invention include: the provision of an improved apparatus and method for automatically handling and gaging articles; the provision of an improved apparatus and method for sequentially transferring articles on a fluid bearing between a sender station and a preselected one of at least two receiver stations in accordance with a predetermined characteristic of the articles determined at a gaging station positioned between the sender and receiver stations; the provision of an improved apparatus and method, and fluid bearing track structure utilized in conjunction therewith, for automatically gaging and segregating articles according to size; the provision of an improved fluid bearing system for handling and gaging articles according to thickness and/or parallelism and grouping the same following gaging into groups of similar characteristics; and the provision of an improved apparatus and method for determining the thickness of flat fragile articles, such as silicon and like wafers, and the parallelism of the opposite faces thereof, in an automatic handling and gaging system which obviates manual handling during transfer, gaging and sorting thereof.

These and other objects of this invention, and various aspects thereof, will become apparent from a study of the following detailed description in which reference is directed to the attached drawings.

DESCRIPTION OF THE PREFERRED EMBODIMENTS

Figure 1:
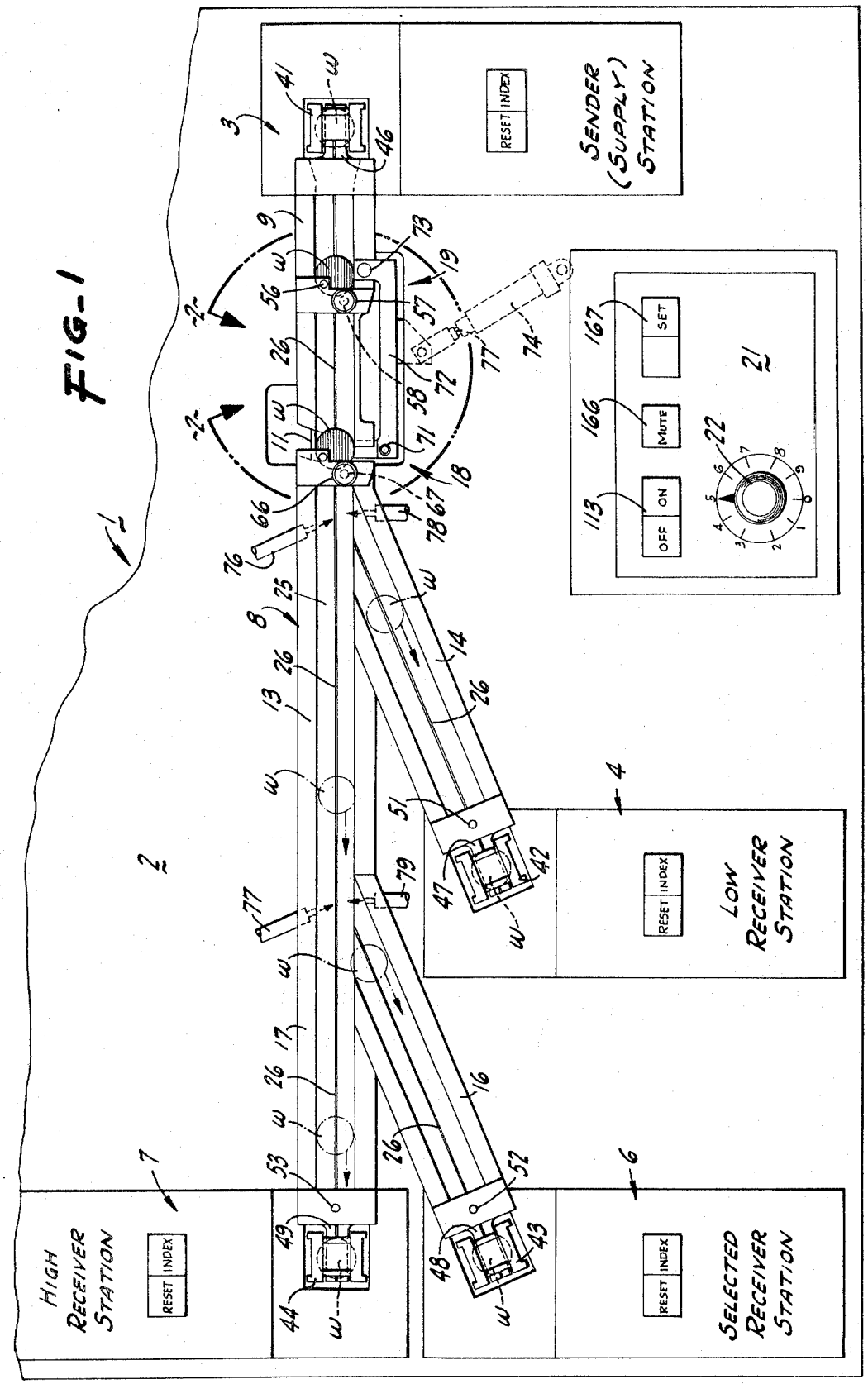
FIG. 1 is a generally schematic plan view of the subject fluid bearing handling and gaging apparatus.

In its broader aspects, the subject invention relates to a system for automatically, sequentially and non-manually handling of a series of articles as the same are transferred between predetermined stations. In its more particular aspects, the subject invention relates to an improved apparatus and method for sequentially transferring individual articles from a sender or supply station to a predetermined one of at least two receiver stations after predetermined characteristics of the articles have been determined automatically at an intermediate gaging station so that the articles may be sorted and grouped according to the determination of such characteristics at the gaging station.

To that end, the subject system includes an improved fluid bearing track structure apparatus which automatically transfers generally flat articles to be gaged and sorted in sequence from a sender station to and past a gaging station into a predetermined one of two or more receiver stations in accordance with the size or other characteristics of the individual articles determined at the gaging station. Preferably the subject apparatus includes automatically indexable means for feeding articles in sequence onto the track structure and for receiving articles in sequence from the track structure in accordance with predetermined size ranges thereof determined by the gaging means past which the articles are transferred in sequence on a fluid bearing.

While certain aspects of the track structure and indexing means of the subject apparatus have been utilized and known heretofore as described previously with respect to Lasch, Jr. et al. application Ser. No. 779,033 and Lasch, Jr. application Ser. No. 174,808, the combination of features disclosed herein, utilizing a pneumatic gaging means in conjunction with automatic fluid bearing transfer means, and means for segregating articles after gaging thereof according to size or other characteristics, has been unknown heretofore and such combination insures the highly desirable and effective results produced with this invention.

Referring first to the generally schematic view of FIG. 1, the subject article handling, gaging and sorting apparatus will be described with respect to one preferred embodiment thereof. Such apparatus is designated, in its entirety, by reference numeral 1 and comprises a supporting framework including a table top 2 upon which the operative components of the apparatus are mounted. Within the framework housing (not shown) which supports the table top 2 are located the pneumatic and electrical components and controls of the apparatus. The entire housing is supported by a series of legs (not shown) to position table top 2 at a suitable height above a supporting surface, such as the floor of a manufacturing plant, for ease of access by the operator of the apparatus.

The pneumatic features of the apparatus will be described in detail hereinafter. However, because the electrical components, controls and circuitry of the apparatus fall within the skill of a qualified electrical design engineer, and because such electrical components, controls and circuitry may be varied to meet particular needs, details thereof will not be set out herein.

The subject apparatus includes as its principal components a sender or supply means positioned at a sender station, designated 3, and a plurality of at least two receiver means, positioned at receiver stations, three in number being shown in FIG. 1, which are designated 4, 6 and 7 respectively. In that regard, while three such receiver stations are illustrated in the embodiment disclosed for the reasons to be described, it should be understood that this invention is utilizable in conjunction with apparatus having two or more receiver stations, the exact number of which depends upon the nature of the articles being automatically handled and the gaging and sorting operations to be effected thereon.

With the illustrated embodiment of FIG. 1, the articles being gaged and sorted constitute generally flat semiconductor wafers of silicon or like material, generally designated W. While herein reference is directed to such silicon wafers as the articles being handled, it should be understood that other articles to be segregated according to size or other characteristics also may be automatically handled and gaged by apparatus utilizing the subject invention. Reference hereinafter to silicon wafers is intended to be illustrative rather than restrictive on the type of generally flat articles on which the apparatus is designed to function.

Wafers W are fed in sequence from the sender station automatically and are transported toward their ultimate destination on a fluid bearing track structure, generally designated 8. Such track structure is comprised of a series of discrete but operatively interconnected fluid bearing track sections designated 9, 11, 13, 14, 16 and 17 respectively. As noted from FIG. 1, track sections 14, 16 and 17 lead to the three receiver stations 4, 6 and 7 previously described. Track section 13 is an intermediate transfer section which carries wafers from the gaging station to be described to the track sections which lead into the respective receiver stations.

As will be described, track section 11 is selectively movable into and out of alignment with the adjacent portions of track sections 9 and 13 between which it is interposed. In that regard, track section 11 is positioned at and forms part of an article gaging station, generally designated 18, at which articles fed thereto are measured individually and in sequence in the manner to be described. Adjacent gaging station 18 and interposed between it and the sender station 3 is a holding station, generally designated 19, at which individual wafers fed from the sender station are positioned and held in readiness for gaging while the gaging station is occupied by a prior wafer in the handling sequence.

It should be understood that following gaging, individual wafers, as seen in dotted lines in FIG. 1, are transferred selectively and in sequence to one of the three receiver stations shown in accordance with a particular characteristic thereof, such as thickness, which has been determined automatically at the gaging station. In that regard, the illustrated apparatus is designed to measure thickness of the wafers within the predetermined selectively adjustable range limitations of the gaging means provided at gaging stations 18. In that regard, wafers which fall within a predetermined selected size range are transferred to the selected receiver station 6. Undersize wafers, i.e., wafers less thick than the selected range, are transferred to the low receiver station 4, while oversize wafers, i.e., wafers more thick than the selected range, are transferred to the high receiver station 7. As will be described, wafer segregation or sorting according to size following gaging is effected automatically in accordance with control signals emanating from the gaging means positioned at the gaging station as will be described.

Positioned on table top 2 for ease of access by the apparatus operator is a control panel, generally designated 21, which carries a gaging means control knob 22 which is rotatable to effect control setting of the gaging means in known fashion, to measure wafer thickness within limits determined by the capability of the particular gage chosen.

It should be understood that the gaging means utilized is selectively extensible from a retracted position into an operative position in which it straddles a wafer while the wafer is held temporarily stationary at the gaging station 18.

When the wafer thickness has been measured, a signal is transmitted to appropriate diverting means to be described provided in conjunction with the track structure for directing each successively gaged wafer into one of the three receiver stations noted. Following gaging, the pneumatic gaging means is retracted to its inoperative position to permit another wafer in the series to be presented to the gaging station for measurement thereat.

Such sequential gaging operations are repeated until the supply of wafers at the sender station is depleted, at which time the apparatus is automatically stopped and a control signal is transmitted to the apparatus operator to indicate replenishment of the wafer supply at the sender station is required. Similarly, when any one of the magazines at the receiver stations is filled, a control signal is transmitted to the apparatus operator to indicate removal of the full wafer magazine and replacement thereof by an empty magazine is required. Thus, except for inserting and removing wafer magazines from the respective sender and receiver stations, operation of the apparatus is entirely automatic and requires no manual handling of wafers during the gaging operation.

Figure 2:
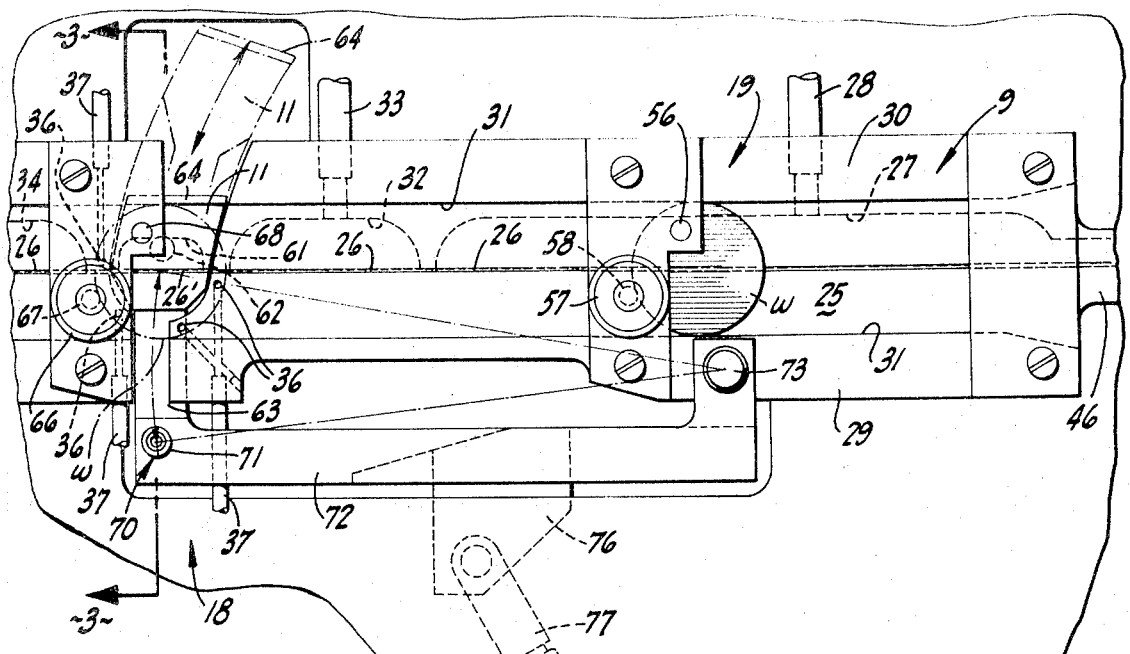
FIG. 2 is a plan view, on an enlarged scale relative to FIG. 1, of a portion of the subject apparatus at which article gaging is effected.

Each of the discrete fluid bearing track sections 9, 13, 14, 16 and 17 preferably is constructed in accordance with the details disclosed in the aforementioned Lasch, Jr. et al. and Lasch applications. In that regard, the simplified construction shown in Lasch, Jr. application Ser. No. 174,808 is particularly well suited for the subject apparatus. As seen in FIG. 2, and referring to track section 9 as exemplary, such track structure comprises a jet insert strip, designated 26, positioned within a metal or plastic track body 25. Insert strip 26 is defined by a metal body which is generally rectangular in cross section and which has a series of regularly spaced jet passages or fluid recesses extending therethrough in the fashion disclosed in detail in said Lasch, Jr. application. Said jet passages are regularly spaced along the length of the jet strip insert and define a series of directional fluid passages or grooves which communicate with a source of fluid bearing material, preferably air under pressure, introduced into a plenum chamber 27 formed in track body 25. The plenum is supplied with bearing fluid through an air conduit 28 connected with a suitable air source.

Air introduced into the plenum 27 emanates through the directional jet passages of the jet insert strip toward the left in FIGS. 1 and 2 to levitate or support wafers positioned on the track section served by the plenum. Thus the wafers are moved longitudinally of the track member 9 between opposed raised shoulder portions 29 and 30 which define a depressed recessed central portion 31 therebetween which corresponds in width generally with the diameter of the wafers to be handled thereby. Thus the wafers pass longitudinally along the track section and are supported and directionally moved by the directional air jets emanating from the jet strip 26 which is positioned generally axially thereof.

Each of the other track sections 13, 14, 16 and 17 is constructed similar to section 9 just described and each is operatively connected with a source of bearing fluid. The track sections 14 and 16 are angularly oriented relative to the intermediate transfer section 13 and the track section 17 which forms a continuation thereof. Sorting of the wafers according to their size, as noted previously, is effected by directing individual wafers onto one of the sections 14, 16 or 17. In each instance, however, the jet strip 26 in each such section has the directional jet passages thereof contoured to move the wafers longitudinally of the respective sections towards their respective receiver stations and each such track section is connected with its own plenum and air supply source in the manner to be described to effect selective wafer movement towards a predetermined receiver station in accordance with the thickness of a given wafer after the same has been measured at the gaging station 18.

As will be described hereinafter, air normally is supplied continuously to each of the respective track sections 9, 13, 14, 16 and 17 when the apparatus is operating. It is only to those portions of the track structure which lie at and adjacent the gaging station 18 that the air supply is selectively and temporarily turned off to permit stationary positioning of the wafers in sequence at the gaging station during measurement thereof. To that end, as seen in FIG. 2, at one side of the gaging station 18 is a short section of fluid bearing track which is in communication with a separate plenum 32 supplied by an air source 33 which is selectively controlled in the manner to be described. At the opposite side of the gaging station is a similar short track section which is in communication with another plenum 34, the supply of air to which is introduced or shut off in accordance with the flow of air to plenum 32. Furthermore, air to the movable track section 11 at the gaging station is selectively turned on and off in accordance with air flow to plenums 32 and 34.

Means are also provided at the gaging station to hold a wafer temporarily stationary after the same has been presented to the gaging station so that measurement thereof may be effected. Such means for maintaining a wafer stationary comprises a series of vacuum ports 36, which are four in number in FIG. 2, and which are provided on opposite sides of the movable track section 11 of the gaging station. Such vacuum ports are operatively connected through suitable vacuum conduits, designated 37, with a suitable vacuum source in known fashion. A vacuum atmosphere is selectively introducible through ports 36 to effect positive holding of a wafer positioned at the gaging station and to prevent displacement thereof during a measuring operation. The movable track section 11 is positioned at a slightly lower level, approximately 0.002 inch, below the level of the adjacent track sections 9 and 13 to preclude interference of such movable section with the function of the vacuum means as a wafer is being positioned at the gaging station.

It will be noted from FIGS. 1 and 2 that the directional fluid bearing jet strips 26 in the respective track sections 9, 11, 13 and 17 are in axial alignment with each other and that the jet strips 26 in the track sections 14 and 16 diverge at a predetermined angle relative to such axial direction. Such angle may vary and, in the embodiment of FIG. 1, track sections 14 and 16 extend at an angle of approximately 30° relative to the axis of track sections 9, 13 and 17.

Before describing in greater detail the operation at the holding and gaging stations 19 and 18, it should be understood that wafer carrying magazines, designated 41, 42, 43 and 44, are provided respectively at the sender station 3 and the receiver stations 4, 6 and 7 respectively. Such magazines constitute wafer receiving means with magazine 41 comprising a supply magazine and magazines 42, 43 and 44 respectively comprising wafer receiving magazines.

Each of such magazines is supported by a suitable indexing mechanism (not shown) for vertically indexing the respective magazines to bring vertically spaced wafer receiving slots therein into alignment with the upper surface of the respective fluid bearing track sections 9, 14, 16 and 17 provided in communication therewith. Such track sections effect automatic removal of wafers in sequence from supply magazine 41 and automatic introduction of wafers in sequence into receiver magazines 42, 43 and 44 without requiring any manual handling of the wafers. Air bearing portions 46, 47, 48 and 49 of the respective fluid bearing track sections 9, 14, 16 and 17 extend into and underlie the respective magazines 41, 42, 43 and 44. In that regard, such track portions effect automatic sequential withdrawal or outfeed of wafers in sequence from magazine 41 and automatic introduction or infeed of wafers in sequence into the respective magazines 42, 43 and 44 in the manner described in such Lasch, Jr. application and reference is directed thereto for a full understanding of the outfeed and infeed operation effected by the magazine indexing means preferably utilized in conjunction with the apparatus shown in FIG. 1. In that connection, it should be understood that the indexing means and magazines provided at the respective stations noted are generally identical in construction and differ from each other in operation only in the fact that magazine 41 is sequentially indexed downwardly by its associated indexing mechanism to present the successive lowermost wafer to be outfed therefrom to the cooperable track portion 46. The respective magazines 42, 43 and 44 are indexed upwardly by their associated indexing mechanisms to present their lowermost empty wafer receiving slots to their cooperable track portions 47, 48 and 49.

Thus, supply magazine 41 is indexed sequentially vertically downwardly to bring the lowermost wafer of the supply in the magazine generally into alignment with the upper surface of track portion 46 so that such lowermost wafer may be automatically withdrawn from the magazine when air is introduced into track section 9. Upon such lowermost wafer being withdrawn from magazine 41, the magazine is ready to be indexed downwardly subsequently to bring the next wafer into alignment with the upper surface of the track portion 46 when the system calls for another wafer to be discharged onto the track section 9.

The respective receiver magazines 42, 43 and 44 are sequentially indexed vertically upwardly to bring successive empty wafer receiving slots thereof into alignment with the upper surface of their associated track portions 47, 48 and 49 so that individual wafers, following gaging and diversion onto one of the respective track sections 14, 16 and 17, may be introduced automatically into successive empty slots in the respective magazines 42, 43 and 44. Upon introduction of a wafer into any one of the receiver magazines 42, 43 or 44, the same is automatically indexed upwardly to present a subsequent empty slot to its associated fluid bearing track portion to prepare the magazine to receive a subsequent wafer fed thereto.

While automatically indexable infeed wafer receiving magazines 42, 43 and 44 of the type described are preferred, in a modified embodiment hereof, depending upon the nature of the articles being handled and gaged, simplified wafer receiving means may be substituted for the vertically indexable magazines as will be described with respect to FIGS. 5 and 6.

As further noted from FIG. 1, each of the sender and receiver stations is provided with reset and index control buttons. By means of the reset buttons, the respective magazines thereat may be moved to their initial operating positions through the indexing mechanism provided in conjunction therewith. The respective index buttons allow each magazine to be manually indexed vertically upwardly or downwardly in increments as may be required during operation of the apparatus. Normally, however, after resetting, additional control indexing by the apparatus operator is not required.

It should further be understood that known photoelectric sensors, designated 51, 52 and 53 respectively, are provided in conjunction with each of the receiver station infeed magazines 42, 43 and 44. Each such sensor transmits a control signal in known fashion to its associated indexing mechanism to move the respective magazines one increment upwardly after a wafer has passed over the sensor into a given magazine. An appropriate time delay is included in each sensor circuit so that a wafer has sufficient time to enter its associated magazine before the magazine is indexed upwardly to receive another wafer. The construction and control function of such photoelectric sensors is described in greater detail in the aforementioned Lasch, Jr. et al. application Ser. No. 779,033.

A similar photoelectric sensor, designated 56, is provided in conjunction with outfeed magazine 41 at sender station 3. However, such photoelectric sensor 56 is positioned above and adjacent the holding station 19 and its function is to transmit an electrical control signal in known fashion to the indexing mechanism for the outfeed magazine 41 to move the same downwardly in selected increments to present the next lowermost wafer in the outfeed magazine 41 to the track portion 46 when the holding station is vacant. That is, with a wafer positioned is the location shown in FIG. 1 at holding station 19, magazine 41 is held stationary. However, when the wafer clears the holding station in the manner to be described, sensor 56 transmits an indexing signal to the indexing mechanism controlling magazine 41 which lowers such magazine and presents another wafer to the track portion 46 for automatic withdrawal and transfer thereof over track section 9 to the holding station 19. Transfer of a wafer from holding station 19 to the gaging station 18 cannot be effected unless and until the gaging station is vacant as will be described.

The holding station includes means for positively stopping wafers in sequence and such means in the embodiment illustrated comprises a solenoid 57 of conventional construction mounted above track section 9. Depending from and operatively controlled by solenoid 57 is a plastic stop pin 58 which normally extends from the solenoid into contact with the top surface of track section 9 to prevent movement of a wafer there past when the pin is extended. Retraction of pin 58 (see FIG. 2) is effected in response to an electrical signal transmitted to solenoid 57 from the gaging station 18. When stop pin 58 is retracted, the wafer previously stopped at the holding station is carried by the air bearing fluid emanating from track section 9 to the gaging station.

Movement of a wafer from the holding station towards the gaging station uncovers sensor 56 at the holding station which transmits a control signal to the solenoid 57 to effect extension of the stop pin 58 to block the track section 9; a control signal also is transmitted thereby to the supply magazine indexing mechanism which results in another wafer being fed from the supply magazine 41 to the holding station as previously described. Thus, the holding station positions a wafer in readiness for automatic transfer to the gaging station when the latter becomes unoccupied.

Figure 3:
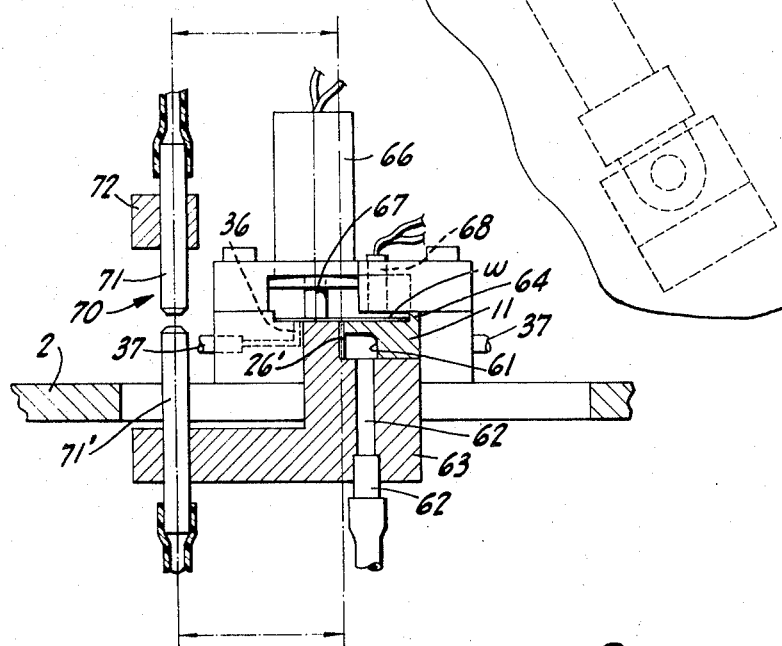
FIG. 3 is a vertical sectional view through that portion of the apparatus shown in FIG. 2 taken in the plane of line 3—3 of that figure.

Details of the gaging station are best seen from FIGS. 2 and 3 taken in conjunction with the generally schematic showing of FIG. 1. In that regard, as noted previously the gaging station includes a laterally movable fluid bearing track section 11 which includes a short section of directional jet insert strip 26' extending thereacross which generally is in alignment with the jet insert strips 26 lying on either side thereof, as seen in FIG. 2, when track section 11 is in its normal position ready to receive a wafer at the gaging station.

Track section 11 includes a plenum 61 in communication with a fluid bearing supply conduit 62 extending upwardly through the base 63 of the laterally movable track section as seen in FIG. 3. The movable track section includes an upstanding shoulder portion 64 against which a wafer positioned at the gaging station is urged by stop means provided at the gaging station. Such stop means, as best seen in FIG. 3, comprises an electrically operated solenoid 66 having a depending stop pin 67 projecting downwardly therefrom and selectively retractable in the manner described previously with respect to the stop pin 58 provided at the holding station 18. The solenoids and stop pins at the respective holding and gaging stations are substantially identical in construction and function. In that regard, stop pin 67 at the gaging station is oriented laterally offset relative to the axis of the track section 19 so that when the stop pin is in the down or stop position it urges a wafer engaged therewith against the shoulder portion 64 of the track section 11. Thus, the wafer is properly positioned relative to the aforementioned vacuum ports 36 provided on opposite sides of the movable track section 11. Normally stop pin 67 is in the down position to prevent movement of any wafer past the gaging station when it is released from the holding station as described previously.

Provided in conjunction with the gaging station is another photoelectric control sensor 68. Such sensor, as seen in FIG. 3, is mounted above the movable track section 11 to sense the presence of a wafer therebeneath by directing its sensing beam downwardly toward the track section. Sensor 68 is also of known construction and function.

When a wafer reaches the movable track section and overlies the same in the position seen in FIG. 2, sensor 68 transmits an electrical control signal in known fashion; such signal effects retraction of the movable track section 11 to the dotted line position as seen in FIG. 2 and simultaneously positions gaging means, generally designated 70, in straddling relationship relative to the opposite faces of a wafer positioned at the gaging station. Such signal further activates the vacuum control to introduce a vacuum atmosphere through ports 36 into engagement with the under surface of the wafer at the gaging station to securely hold the same in the dotted line position seen in FIG. 2. When the wafer is thus held, and when the gaging means is properly positioned, the thickness of the wafer may be measured rapidly and accurately by the gaging means.

In that regard, it will be noted that the gaging means 70 is of the pneumatic type and constitutes opposed air nozzles 71 and 71' (FIG. 3) which are carried on a bifurcated pivotal arm 72, 72' which is rotatable about a pivot axis defined by pin 73 supported by the track section 9 as seen in FIG. 2, for pivotal movement between the solid line and dotted line positions shown in FIG. 2. Such pivotal mounting arm also carries the movable track section 11 therewith so that as the arm is pivoted, it moves the track section to the dotted line retracted position shown in FIG. 2 while simultaneously moving the pneumatic gaging means 70 to the operative position shown in dotted lines in such figure.

A pneumatic control cylinder 74, shown in dotted lines in FIG. 2, is operatively connected by a mounting block 76 with the pivotal arm for effecting selective pivotal movement of the arm and the movable track structure and gaging means carried thereby as noted. Extension and retraction of a piston 77 controlled by the pneumatic cylinder 74 effects selective pivotal movement of the arm in known fashion.

Thus, referring to FIG. 3 it should be understood that when the nozzles 71, 71' of the gaging means are moved from the retracted position seen in FIG. 3 to the extended position in which they straddle a wafer W at the gaging station which is being held stationary by the vacuum means 36, 37 provided thereat, thickness gaging of the wafer may be effected in accordance with the known operation of the gaging means chosen.

In that regard, various gaging means may be utilized. However, the pneumatic gaging means chosen is well suited for the described purpose and is of the type which is commercially available. While that gaging means forms no specific part of this invention, one specific pneumatic gage which has been found very effected for the stated purpose is the Model 88 "Automation Controller" marketed by Moore Products Company of Spring House, Pennsylvania. Such gage is illustrated and described in detail in Moore technical literature relating to such Model 88 pneumatic gage device.

For purposes of the present invention, it should be understood that the opposing nozzles 71, 71' of the pneumatic thickness gage direct pulses or jets of filtered air, emanating from a suitable air supply which is precisely regulated, against opposite surfaces of the wafer being measured. In known fashion, such air jets strike the opposite surfaces of the wafer and determine the thickness thereof in accordance with the control setting of the knob 22 at control panel 21. Such measurement is effected without contacting the wafer directly by any mechanical measuring means.

In that regard, measuring gages of the noted type are available which have capability of measuring articles of various sizes. By way of example, one embodiment of the present apparatus has been devised to determine wafer thicknesses within the range of 0.005 to 0.006 inch in increments of 0.0001 inch. Thus, the control knob 22 may be set at any suitable setting desired for the thickness of wafers to be selected.

As seen in FIG. 1, with the wafer thickness setting knob 22 positioned in the number 5 position, wafers measuring 0.0054 to 0.0055 will fall within the preselected size range and will be directed into the selected receiver station 6. Wafers falling below that thickness range will be directed into the low receiver station 4 while wafers falling above that thickness range will be directed into the high receiver station 7. Thus, depending upon the setting of control knob 22 which regulates the measuring gage, wafer thicknesses in increments of 0.0001 inch may be measured effectively.

After a wafer has been measured, the pneumatic gage is retracted and the track section 11 is returned to the solid line position of FIG. 1. Then, stop pin 67 is raised by control solenoid 66 which permits the air bearing jet insert 26' to move the measured wafer from the gaging station onto the intermediate transfer track section 13 for movement to one of the receiver stations as noted previously. In that regard, depending upon the thickness of the particular wafer having been measured, such wafer is allowed to travel straight into the high station 7 or is selectively diverted into the selected receiver station 6 or the low receiver station 4.

Upon release of a wafer from the gaging station, the stop pin 58 at the holding station is elevated by its associated solenoid 57 and a subsequent wafer in the series is released from the holding station for movement on track section 9 to the gaging station where it is automatically stopped and held for measurement in the manner noted previously.

As noted, the gaging means 70 regulates introduction of a previously measured wafer into one of the receiver stations in accordance with the thickness of such wafer. In that regard, means is provided in conjunction with the respective receiver track sections downstream of the gaging station for directing or diverting each wafer in sequence into the appropriate receiver station. In that regard, adjacent each of the areas of juncture of the angled track sections 14 and 16 with the intermediate track section 13 is provided means for diverting selectively wafers into one or the other of such track sections in accordance with electrical control signals emanating from the gaging means. Positioned adjacent the mouth of track section 14 on the opposite side thereof is pneumatic diversion means which take the form of a nozzle, designated 76. A similar pneumatic diversion means in the form of a nozzle, designated 77, is provided at the juncture of track section 16. Positioned generally opposite each of the aforementioned diverting air jet nozzles 76 and 77 are opposing air jet nozzles or outlets 78 and 79 similarly positioned adjacent the junction between the respective angled track sections 14 and 16 and the intermediate track section 13.

It should be understood that the respective air jet nozzles or outlets 76, 77, 78 and 79 extend through the side walls or elevated shoulder portions of the respective track sections and are intended to direct a flow of air under moderate pressure inwardly towards the axis of the track section 13 in response to control signals emanating from the gaging means. In that regard, if a wafer is measured at the gaging station as being lower than the selected thickness range, air jet nozzle 76 is actuated upon release of the wafer from the gaging station while the opposing jet nozzle 78 is inactivated. Such function will cause the wafer to be diverted laterally from track section 13 into the angled track section 14 for passage thereover into the low receiver magazine 42. If, however, such wafer is within the selected thickness range, or in the high thickness range, jet nozzle 76 is inactivated and jet nozzle 78 is activated to direct a stream of air toward the axis of track section 13 to maintain the wafer on the track section 13.

Thereafter, depending upon the thickness of the wafer, namely whether the same falls within the selected range or within the high range, one of the jet nozzles 77 or 79 is selectively activated to divert such wafer into the selected track section 16 or to insure that the same travels straight into the high track section 17.

It should be understood, therefore, that within the capability of the gaging means chosen, two or more selective segregations of wafers may be made following movement thereof from the gaging station. Pneumatic gages of the type described are available which possess capability of diverting wafers into as many as 20 or more different size categories and, although only three such diversionary paths are shown in the embodiment of FIG. 1, it should be understood that the broader capability noted is also possible without departing from the spirit of this invention.

The pneumatic control system for regulating the various functions of the embodiment shown in FIGS. 1 through 3 will be described hereinafter.

As noted, the present invention has additional capability, depending upon the construction of the pneumatic gage employed therewith, to determine the presence or absence of parallelism of each wafer during measurement thereof. In that regard, reference is directed to FIG. 4 in which a modified pneumatic gage is employed. Such a gage is designed to determine wafer thickness and to determine whether or not a given wafer falls within the accepted range of parallelism, i.e., whether or not the same is transversely bowed beyond acceptable limits.

Figure 4:
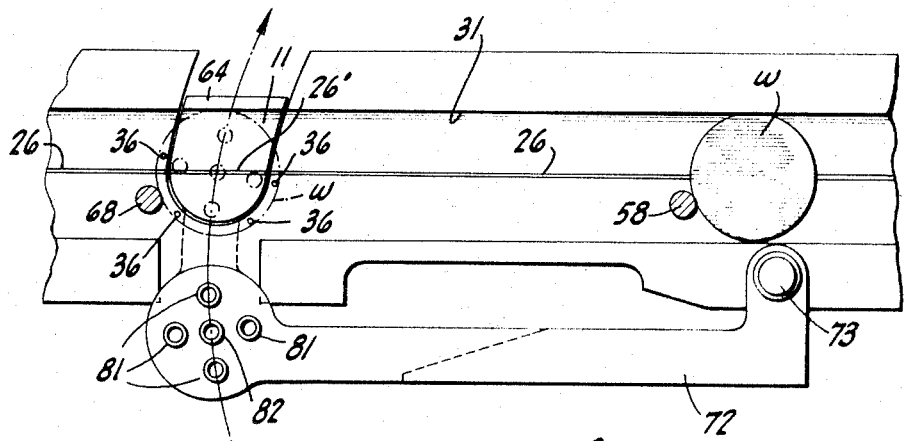
FIG. 4 is a plan view of a portion of a modified means for gaging articles at a gaging station.

To that end, the gage employed in FIG. 4 includes a plurality of opposed pneumatic nozzles, five in number. Four such nozzles, each designated 81, are uniformly spaced to be in alignment with outer edge margins of a wafer. The fifth nozzle, designated 82, is centrally located between the other nozzles. It should be understood that a similar five nozzle gage head is positioned beneath the upper gage head seen in FIG. 4 and is carried by the arm 72 in the same fashion described previously with respect to the embodiment of FIG. 3.

In that regard, the five nozzle gage shown in FIG. 4 directs five jets of air in known fashion against opposite surfaces of a wafer positioned at the gaging station. The central nozzle 82 and its underside counterpart measure the thickness of the wafer and make a determination as to high, low or selected range, while the peripheral nozzles 81 and their underlying counterparts determine the amount of curvature, or bow, of the wafer. If the wafer is substantially flat, i.e., with its opposite surfaces parallel, only the central measuring nozzle 82 will function to direct the wafer to the predetermined receiver station depending upon the wafer's thickness. However, if the wafer is bowed beyond acceptable limits, the same will be diverted to a fourth receiver station (not shown) which may branch out from the intermediate track section 13 seen in FIG. 1 either to the right or left thereof, depending upon the space limitations for the particular apparatus.

Figure 5:
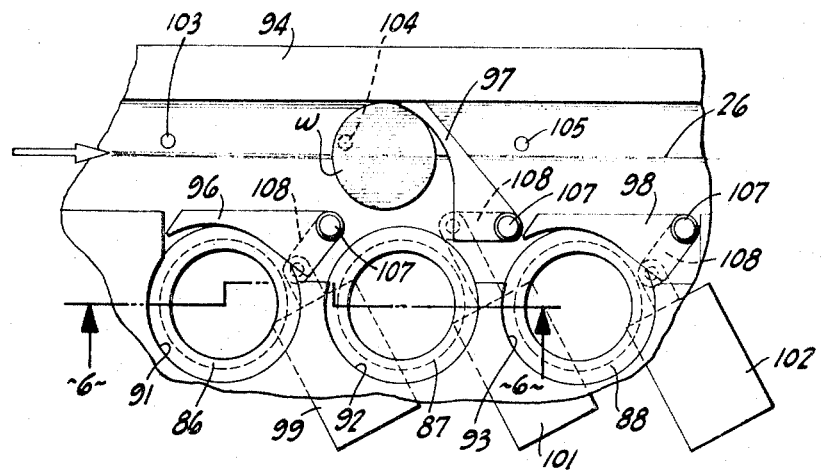
FIG. 5 is a plan view of a modified embodiment of a station for receiving articles in sequence following gaging thereof to sort the same in accordance with their previously gaged characteristics.
Figure 6:
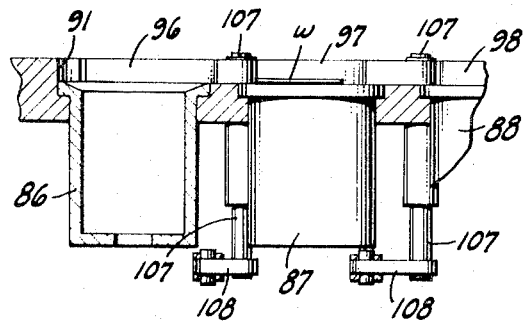
FIG. 6 is a vertical sectional view through the modification shown in FIG. 5 taken in the plane of line 6—6 of that figure.

Referring now to FIGS. 5 and 6, a further modification of the present invention is illustrated in which mechanical, rather than pneumatic, means are provided for diverting wafers into preselected receiver stations. In that regard, three such receiver stations, designated 86, 87 and 88, are provided. Such receiver stations may take the form of the vertically indexable magazines of the type described previously; however, in the embodiment shown, such receiver stations comprise open-ended plastic or metal cups supported in suitable recesses 91, 92 and 93 provided adjacent a fluid bearing track section designated 94 which lies downstream from the gaging station of the type described previously. In that regard, such cups would be utilized in place of vertically indexable magazines only in conjunction with sorting articles which can rest directly one upon the other without causing damage thereto. When a given cup is filled, it is merely moved from its receiving recess in which it is supported and is replaced by another empty cup.

In the embodiment illustrated in FIGS. 5 and 6, each of the receiver stations is provided with extensible and retractable means for selectively diverting wafers into a predetermined cup in response to control signals from the gaging station. Such diverting means constitutes extensible and retractable arms, designated 96, 97 and 98, respectively. Such arms are activated by associated electrical solenoids 99, 101 and 102 respectively, which are selectively actuatable in response to signals received from the gaging station to extend a predetermined one of the arms to halt and divert a wafer into an associated cup in the manner seen with respect to extended arm 97 in FIG. 5. In that regard, when the arms are retracted they cooperate to define a shoulder or side wall of the fluid bearing track structure in the manner also seen in FIG. 5.

Provided in conjunction with the respective wafer diverting arms are a series of photoelectric sensors 103, 104 and 105 which effect retraction of a given diverting arm associated therewith when a wafer has passed thereover and has been directed thereby into an associated receiver station, defined by one of the cups noted.

As seen in FIG. 6, each of the diverting arms 96, 97 and 98 is mounted on a suitable pivot pin, each of which is designated 107 and between which extends a link 108 which is operatively connected with an associated solenoid plunger, in the manner seen in FIG. 5, to effect selective extension and retraction of a diverting arm as noted.

While in the embodiment shown in FIGS. 5 and 6 three receiver stations are provided, it should be understood that any number of such stations may be provided in line with each other along one side of the track structure or on opposite sides of the track structure. The limitations in the number of such diverting arms and associated receiver stations is determined by the measuring capability of the gaging means provided at the gaging station.

Figure 7:
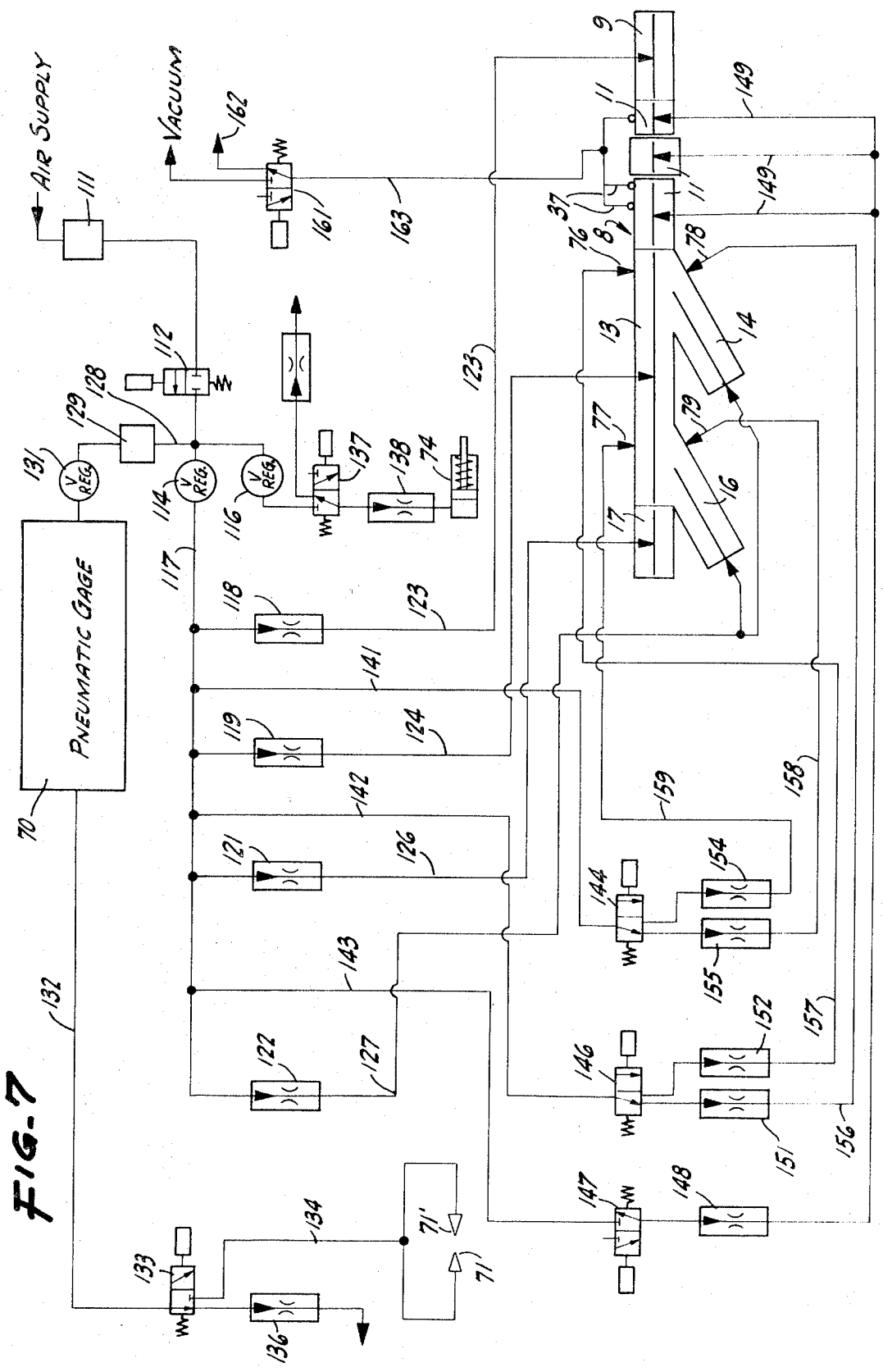
FIG. 7 is a diagrammatic view of the pneumatic system utilized in conjunction with the preferred embodiment of the subject article handling and gaging system.

Referring now to FIG. 7, the pneumatic control system for regulating operation of the embodiment shown in FIGS. 1 through 3 is illustrated. In that regard, air from a suitable supply is introduced into the system at an exemplary pressure of 70 psi. and passes through an appropriate filter 111 into and through a main shutoff solenoid valve 112 regulated by a main on-off switch 113 provided at the control panel 21 (FIG. 1). From the main shutoff valve the air supply passes through two pressure regulators, 114 and 116, the prior of which regulates the air pressure to approximately 2 psi., and the latter of which regulates the air pressure to approximately 35 psi.

Fluid bearing air from regulator 114 passes through branches of a suitable conduit 117 into conventional control valves 118, 119, 121 and 122, and then into the plenums of the aforementioned fluid bearing track sections 9, 13, 16 and 17 mentioned previously. As noted, the air supply to such track sections is on at all times when the main on-off switch 113 is in the on position. Conduits 123, 124, 126 and 127 are provided to conduct air to the track sections noted.

Air passing from the main solenoid shut-off valve 112 also passes, through conduit 128, into the pneumatic thickness measuring gage 70, but prior to introduction thereto such air passes through a filter 129 and a pressure regulator 131, the latter of which preferably maintains the pressure entering the gage at approximately 65 psi. From the gage 70, the air is selectively introduced through conduit 132 into a control solenoid valve 133 from which it passes into the gage measuring nozzles 71, 71' mentioned previously via conduit 134. A suitable exhaust valve 136 is provided in conjunction with the gage in known fashion for the known purpose.

Air passing through the aforementioned pressure regulator 116 enters a solenoid valve 137 and passes therethrough into a conventional control valve 138 for regulating and selectively activating the pneumatic piston 74 which extends and retracts selectively the gaging means and movable track section 11 defined by the opposed nozzle 71, 71'.

Air passing through pressure regulator 114 mentioned previously further branches into three conduits 141, 142 and 143, each of which is in communication with solenoid valves 144, 146 and 147, respectively. The latter solenoid valve 147 regulates a control valve 148 which controls the introduction of air bearing fluid into the plenums of the movable track section 11 and those track portions lying immediately adjacent such movable track section, through a series of branch conduits 149. The other solenoid valves 144 and 146 regulate selective introduction of air into the respective diversionary nozzles 76 and 77, or the straight flow nozzles 78 and 79, through control valves 151, 152, 153 and 154, and conduits 156, 157, 158 and 159, respectively, which are in operative communication with the respective jet nozzles noted.

The remainder of the pneumatic system comprises a source of vacuum, at approximately 18 inches of mercury, which selectively passes through a solenoid valve 161 having a conventional exhaust port 162 in conjunction therewith. A vacuum atmosphere may thus be introduced through solenoid valve 161 through conduit 163 into the aforementioned vacuum branch conduits 37 provided at the gaging station for the purpose of holding a wafer stationary at such station during measurement thereof.

It should be understood that the subject invention is utilizable with wafers of various thicknesses and diameters. The illustrated and described system has been found particularly well suited for handling wafers in batches of twenty five (that is, the capacity of the outfeed and infeed magazines mentioned) having diameters Of 0.850 inches and thicknesses within the range of 5 to 6 thousandths. Of course, articles of different sizes and magazines of different capacities also may be accommodated by making appropriate design changes to the apparatus.

It should be understood that the apparatus further preferably includes signal means in the form of an audible alarm which indicates to the operator when any one of the outfeed or infeed magazines needs replacement. In that regard, provided at the control panel 21 is a mute control button 166 which may be depressed to shut off an audible alarm which sounds when magazine replacement or other attention is required. The mute button remains lighted until the appropriate operator activity has been completed, namely inserting a full magazine at the sender station or removing a full magazine from a given receiver station and replacing the same with an empty magazine.

With the arrangement shown in FIGS. 1 through 3, a system is devised which is capable of handling up to 1,000 wafers per hour, exclusive of operator handling time required during the removal and substitution of an appropriate magazine at the sender or receiver stations.

Also provided at the control panel is a set control button 167, the purpose of which is to allow the gaging means to be positioned in the operative position for calibration and adjustment thereof prior to actuation of the machine for gaging a given series of wafers.

Having thus made a full disclosure of this invention and preferred embodiments thereof, reference is directed to the appended claims for the scope of protection to be afforded thereto.

I claim:

1. Apparatus for automatically handling and gaging articles, such as silicon wafers, comprising
  A. fluid bearing track structure extending between a sender station at which a supply of articles to be gaged is located, and at least two receiver stations,
    1. said track structure including at least two track sections which lead to said receiver stations,
  B. gaging means at a gaging station interposed between said sender station and said receiver stations for automatically gaging a predetermined characteristic, such as size, of articles presented to said gaging station in sequence, which includes
    1. a non-contact measuring gage selectively movable into and out of alignment with an article held stationary at said gaging station for determining said characteristic without contacting such article,
    2. extensible and retractable mechanism at said gaging station for moving said gage into and out of alignment with an article as the same is held at such station by said holding means,
  C. means at said gaging station for holding individual articles presented thereto stationary during gaging thereof,
  D. diverting means, responsive to control signals emanating from said gaging means, positioned between said gaging station and said receiver stations for selectively diverting individual articles in sequence onto one of said track sections toward one of said receiver stations or permitting such articles to pass said diverting means and move on the other of said track sections toward the other of said receiver stations, and E. means at said receiver stations for accepting articles in sequence delivered thereto on said respective track structure sections.

2. The apparatus of claim 1 in which said measuring gage includes structure for measuring a predetermined dimension, such as thickness, of such articles as the same are sequentially held stationary at said gaging station by said holding means.

3. The apparatus of claim 1 in which said holding means comprises vacuum mechanism at said gaging station to which such articles are presented in sequence at said gaging station.

4. The apparatus of claim 1 which further includes

F. stop means at said gaging station for positively halting movement of articles presented to said gaging station so that said holding means may engage and hold each such article.

5. The apparatus of claim 4 in which said stop means comprises an extensible and retractable stop pin selectively interposable in the path of each article presented to said gaging station.

6. The apparatus of claim 1 which further includes

E. stop means at a holding station interposed between said sender station and said gaging station for holding articles fed in sequence from said sender station in readiness for release to said gaging station when said gaging station is unoccupied.

7. The apparatus of claim 6 in which said stop means comprises an extensible and retractable stop pin selectively interposable in the path of each article presented to said holding station.

8. The apparatus of claim 1 in which said measuring gage comprises a pneumatic gage selectively movable into and out of straddling relationship with an article held stationary at said gaging station for determining the thickness thereof without physically contacting such article.

9. The apparatus of claim 8 in which said measuring gage includes structure for determining the presence or absence of parallelism of each article presented to said gaging station.

10. The apparatus of claim 1 in which said diverting means comprises an air jet positioned at the juncture of said one track section with said other track section for urging an article onto said one track section from said other track section when said air jet is activated.

11. The apparatus of claim 10 which further includes

E. air jet means, responsive to control signals emanating from said gaging means, positioned at said juncture of said one track section with said other track section for precluding diversion of an article onto said one track section when said air jet means is activated.

12. The apparatus of claim 1 in which said diverting means comprises at least two pivotal gates selectively extensible into the path of an article moving on said track structure for directing such article into a predetermined one of said receiver stations in response to the characteristic of such article gaged at said gaging station.

13. The apparatus of claim 1 which further includes

E. article magazines at said sender and receiver stations for discharging and accepting articles in sequence to and from said track sections, and F. indexing mechanisms at said sender and receiver stations for automatically indexing each such magazine relative to its associated track section to discharge an article thereto or receive an article therefrom.

14. The apparatus of claim 1 which includes at least three receiver stations and three track sections leading from said gaging means to said receiver stations, and in which said diverting means includes at least two segments for selectively diverting individual articles onto a predetermined one of said three track sections.

15. The apparatus of claim 1 which said track structure further includes 1. a short track section at said gaging station onto and over which articles presented to said gaging station pass, and F. means for selectively moving said short track section into and out of alignment with the remainder of said track structure and for simultaneously moving said gaging means into operative straddling relationship with an article held at such station by said holding means.

16. A method for automatically and sequentially sorting articles, such as silicon wafers, according to a gaged characteristic thereof, such as size, without manual handling thereof, comprising, A. feeding articles in sequence to a gaging station, B. holding individual articles stationary at said gaging station as the same are sequentially fed thereto, C. determining said characteristic of each article fed to said gaging station without physically contacting the same thereat by moving a non-contact measuring gage selectively into and out of alignment with each article held stationary thereat, and D. automatically segregating said articles into groups having similar characteristics following sequential gaging thereof at said gaging station.

17. The method of claim 16 in which said articles are fed to said gaging station on a fluid bearing which supports such articles above a track structure during such feeding.

18. The method of claim 16 which includes

D. temporarily halting movement of individual articles in sequence at a holding station to maintain such articles in sequential readiness for gaging at said gaging station, and E. releasing articles in sequence from said holding station and feeding the same in sequence to said gaging station when the latter is unoccupied.

19. The method of claim 16 in which determining said characteristic of each said article comprises measuring the thickness thereof at said gaging station.

20. The method of claim 16 in which determining said characteristic of each said article comprises determining at said gaging station whether opposite generally planar surfaces thereof are parallel.

21. The method of claim 16 in which determining said characteristic of each said article at said gaging station comprises measuring the thickness thereof while simultaneously determining whether opposite generally planar surfaces thereof are parallel.

22. The method of claim 16 in which said articles are fed to and past said gaging station on a fluid bearing track structure defined by a first section on which articles are fed to said gaging station and at least two other track sections beyond said gaging station, said method further including D. segregating said articles into said groups by selectively diverting individual articles onto one or the other of said other two track sections in accordance with the determination of said characteristic of each said article at said gaging station.

23. The method of claim 22 in which said articles are selectively diverted onto such one or the other of said two track sections by directing a jet of fluid thereagainst as each such article reaches the juncture between said two track sections.

24. The method of claim 22 in which said articles are segregated by blocking one of said other two track sections to selectively divert such articles in sequence from such one track section to preclude its passage beyond a predetermined location at which said selective diversion is effected.

25. The method of claim 16 which includes determining said characteristic of each said article at said gaging station by moving a pneumatic gaging mechanism selectively into and out of alignment with each said article while the same is held temporarily stationary at said gaging station.

26. The method of claim 25 in which each said article is held stationary at said gaging station by a vacuum atmosphere applied thereto while said article is being gaged by said pneumatic gaging mechanism.

27. The method of claim 16 in which said characteristic of each article fed to said gaging station is determined by moving said non-contact measuring gage selectively into and out of straddling relationship with each article held stationary at said gaging station.

28. Apparatus for automatically handling and gaging articles, such as silicon wafers, comprising,
   A. fluid bearing track structure extending between a sender station at which a supply of articles to be gaged is located, and at least two receiver stations,
      1. said track structure including at least two track sections which lead to said receiver stations,
   B. gaging means at a gaging station interposed between said sender station and said receiver stations for automatically gaging a predetermined characteristic, such as size, of articles presented to said gaging station in sequence,
   C. diverting means, responsive to control signals emanating from said gaging means, positioned between said gaging station and said receiver stations for selectively diverting individual articles in sequence onto one of said track sections toward one of said receiver stations or permitting such articles to pass said diverting means and move on the other of said track sections toward the other of said receiver stations,
   D. means at said receiver stations for accepting articles in sequence delivered thereto on said respective track structure sections, and
   E. means at said gaging station for holding individual articles presented thereto stationary during gaging thereof,
and in which said gaging means includes
   1. a pneumatic measuring gage selectively movable into and out of straddling relationship with an article held stationary at said gaging station for determining the thickness thereof without physically contacting such article, and
   2. extensible and retractable mechanism at said gaging station for moving said measuring gage into and out of said straddling relationship relative to an article being gaged at said station as such article is held stationary at said station by said holding means.

29. The apparatus of claim 28 in which said measuring gage includes structure for determining the presence or absence of parallelism of each article presented to said gaging station and held stationary thereat.

30. The apparatus of claim 28 in which said track structure further includes
   1. a short track Section at said gaging station onto and over which articles presented to said gaging station pass, and
   F. means for selectively moving said short track section into and out of alignment with the remainder of said track structure as said gaging means is moved into operative straddling relationship with an article held stationary at such station by said holding means.

31. A method for automatically and sequentially sorting flat articles, such as silicon wafers, according tO a gaged characteristic thereof, such as size, without manual handling thereof, comprising
   A. feeding articles in sequence to a gaging station,
   B. measuring the thickness of each article fed to said gaging station while simultaneously determining whether opposite generally planar surfaces thereof are parallel without physically contacting the same thereat, and
   C. automatically segregating said articles into groups having similar characteristics following sequential gaging thereof at said gaging station.

32. A method for automatically and sequentially sorting articles such as silicon wafers, according to a gaged characteristic thereof, such as size, without manual handling thereof, comprising
   A. feeding articles in sequence to a gaging station,
   B. determining said characteristic of each article fed to said gaging station without physically contacting the same thereat by moving a pneumatic gaging mechanism selectively into and out of alignment with each said article while the same is held temporarily stationary at said gaging station, and
   C. automatically segregating said articles into groups having similar characteristics following sequential gaging thereof at said gaging station.

33. The method of claim 32 which further includes
   D. holding each said article stationary at said gaging station by applying a vacuum atmosphere thereto while said article is being gaged by said pneumatic gaging mechanism.

* * * * *